(12) United States Patent
Choi et al.

(10) Patent No.: US 12,086,958 B2
(45) Date of Patent: Sep. 10, 2024

(54) METHOD AND DEVICE WITH SYNTHETIC IMAGE GENERATION

(71) Applicant: SAMSUNG ELECTRONICS CO., LTD., Suwon-si (KR)

(72) Inventors: Kyuhwan Choi, Yongin-si (KR); Jingu Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 17/977,604

(22) Filed: Oct. 31, 2022

(65) Prior Publication Data

US 2023/0206410 A1 Jun. 29, 2023

(30) Foreign Application Priority Data

Dec. 23, 2021 (KR) .................. 10-2021-0186445

(51) Int. Cl.
*G06T 5/50* (2006.01)
*G06T 3/4053* (2024.01)
*G06T 5/73* (2024.01)
*H04N 23/62* (2023.01)

(52) U.S. Cl.
CPC .............. *G06T 5/50* (2013.01); *G06T 3/4053* (2013.01); *G06T 5/73* (2024.01); *H04N 23/62* (2023.01); *G06T 2207/20221* (2013.01)

(58) Field of Classification Search
CPC ........... G06T 5/50; G06T 3/4053; G06T 5/73; G06T 2207/20221; G06T 3/4038; H04N 23/62; H04N 17/002; H04N 5/272; H04N 23/45; H04N 23/695; H04N 23/698; H04N 23/90; H04N 23/951; H04N 5/265; H04N 23/80

USPC ......................................................... 348/241
See application file for complete search history.

(56) References Cited

U.S. PATENT DOCUMENTS

| | | |
|---|---|---|
| 7,639,897 B2 | 12/2009 | Gennetten et al. |
| 7,961,983 B2 | 6/2011 | Uyttendaele et al. |
| 9,826,146 B2 | 11/2017 | Morioka et al. |
| 10,571,644 B2 | 2/2020 | Shabtay et al. |
| 10,805,534 B2 | 10/2020 | Noh et al. |

(Continued)

FOREIGN PATENT DOCUMENTS

| | | | |
|---|---|---|---|
| JP | 3799861 B2 | 5/2006 |
| JP | 6726931 B2 | 7/2020 |

(Continued)

*Primary Examiner* — Lin Ye
*Assistant Examiner* — Chan T Nguyen
(74) *Attorney, Agent, or Firm* — NSIP Law

(57) ABSTRACT

A method and device with synthetic image generation is included. A method includes acquiring a first image captured by a first camera and second images captured by a second camera having a narrower field of view (FOV) when the second images are captured thereby than that of the first camera when the first image is captured thereby. The method also includes detecting respective blur statuses of each of the second images, selecting a region of the first image on the basis of the region corresponding to a second image, of the second images, selected based on a determination that the blur status of the second image satisfies a blur condition, and generating a synthetic image by synthesizing together the selected region of the first image and the second images not including the selected second image.

31 Claims, 10 Drawing Sheets

(56) References Cited

U.S. PATENT DOCUMENTS

| | | | |
|---|---|---|---|
| 10,935,870 B2 | 3/2021 | Shabtay et al. | |
| 10,972,672 B2 | 4/2021 | Zhen et al. | |
| 2018/0302551 A1* | 10/2018 | Yamajo | H04N 23/843 |
| 2021/0097644 A1* | 4/2021 | Sommerlade | G06T 5/73 |
| 2021/0132466 A1* | 5/2021 | Shabtay | H04N 23/695 |
| 2023/0065883 A1* | 3/2023 | Ilan | H04N 5/265 |

FOREIGN PATENT DOCUMENTS

| | | |
|---|---|---|
| JP | 6833746 B2 | 2/2021 |
| WO | WO 2021/116851 A2 | 6/2021 |

* cited by examiner

700A

700B

METHOD AND DEVICE WITH SYNTHETIC IMAGE GENERATION

CROSS-REFERENCE TO RELATED APPLICATIONS

This application claims the benefit under 35 USC § 119(a) of Korean Patent Application No. 10-2021-0186445, filed on Dec. 23, 2021, in the Korean Intellectual Property Office, the entire disclosure of which is incorporated herein by reference for all purposes.

BACKGROUND

1. Field

The following description relates to a method and device with synthetic image generation.

2. Description of Related Art

When capturing a long-distance image, for example using a zoom feature of a camera, resolution of the image may be suboptimal due to reduced field of view (FOV) of the camera. When capturing a long-distance image it may be helpful to increase the aperture of the camera's lens or to adjust a sensor of the camera. It may be more helpful to adjust a focal length of the camera. For some cameras, however, it may be impractical to change the focal length for capturing a long-distance image.

FIG. 1 illustrates a relationship between a focal length, a field of view (FOV), and a size of an image for an optical system 100. When the focal length F' is increased to capture a long-distance image, the FOV decreases proportionally, and a resolution of an image will decrease accordingly. The relationship between the FOV and the focal length F' may be generally geometrically defined as in the following Equation 1.

$$\tan(FOV/2) = y'/2/F' \qquad \text{Equation 1}$$

In Equation 1, as noted, F' denotes the focal length and y' denotes the size of the image. As can be seen, when there are limits on how much the focal length F' can be adjusted (if at all), a long-distance image will have a small FOV (for a given image size) compared to a near-distance at the same focal length F' (for the given image size), and therefore the long-distance image will have lower resolution compared to the near-distance image. It may be helpful to apply image processing techniques, for example when camera constraints might otherwise limit the quality of images generated by the camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes acquiring a first image captured by a first camera and second images captured by a second camera having a narrower field of view (FOV) when the second images are captured thereby than that of the first camera when the first image is captured thereby. The method also includes detecting respective blur statuses of each of the second images, selecting a region of the first image on the basis of the region corresponding to a second image, of the second images, selected based on a determination that the blur status of the second image satisfies a blur condition, and generating a synthetic image by synthesizing together the selected region of the first image and the second images not including the selected second image.

The second images may be captured based on scanning movements of the second camera caused by a motor, wherein the scanning movements may be determined based on a determined region of interest (ROI).

The ROI may be determined based on an object detected within the FOV of the first image or may be determined based on a position based on an input generated by a user input device.

The acquiring of the first image may include inputting an external parameter and an internal parameter to the second camera.

The external parameter may specify movement of the second camera, and the internal parameter may specify an optical performance of the second camera.

The acquiring of the second images may include determining a shooting condition of the first camera in correspondence with capturing the first image and applying the shooting condition to the second camera for capturing the second images.

The shooting condition of the first camera may include one or more of a shutter speed, an aperture value, or an international standard organization (ISO) value of the first camera.

The blur statuses may include respective measures of blur in the second images, and the blur condition may include comparing a measure of blur in a region of the first image with a measure of blur in a second image.

The generating of the synthetic image may include stitching the selected region of the first image with a second image that corresponds to a region of the first image that is adjacent to the selected region of the first image.

The generating of the synthetic image may include performing a digital super resolution enhancement on at least a portion of the selected region of the first image.

The second images may respectively correspond to regions of the first image, and each of plural regions of the first image may be adjacent to another region of the plural regions of the first image.

In one general aspect, a device includes at least one processor configured to access a first image of a physical area captured by a first camera, access second images of the physical area captured by a second camera, compute respective blur values of the second images, select a region of the first image based on determining that a blur condition is satisfied by a blur value of a second image, of the second images, that corresponds to the region, and generate the synthetic image by synthesizing together the selected region and the second images not including the second image that corresponds to the selected region.

The device may be an electronic device that further includes the first camera and the second camera.

The second camera may have a movable direction of capture, and the second images may be captured by moving the direction of capture in a clockwise direction or in a counterclockwise direction.

The moving of the direction of capture may be based on a region of interest (ROI) determined based an object detected within the first image or based on a position indicated by an input received from a user input device.

The at least one processor may be configured to provide an external parameter and/or an internal parameter to the second camera.

The external parameter may indicate performance of a motor for moving the second camera, and the internal parameter may include a photographic parameter of the second camera.

The at least one processor may be further configured to apply to the second camera an image-capturing parameter in effect for the first camera when the first camera captures the first image and control the second camera with the applied image-capturing parameter to capture the second images.

The image-capture parameter may include at least one of a shutter speed, an aperture value, or an international standard organization (ISO) value of the first camera.

The device may be a smartphone.

The blur condition may include a blur value of the region of the first image and the determining whether the blur condition is satisfied may include comparing the blur value of the region of the first image with the blur value of the second image corresponding to the region of the first image.

The synthesizing may include stitching the region of the first image with at least one of the second images.

The at least one processor may be further configured to perform a digital super resolution on an interface of a second image and the selected region of the first image.

The synthetic image may include an image of the physical area.

The device may further include a first camera and a second camera, the first camera having a wider field of view (FOV0 than the second camera.

In one general aspect, a method includes capturing a first image of a physical scene, wherein the physical scene includes physical regions, and the first image includes regions that depict the physical regions, respectively, capturing second images of the physical scene, wherein the second images respectively depict the physical regions, computing respective blur values for the second images. The method also includes generating a synthetic image based on the first image, the second images, and the blur values, and the generating includes including in the synthetic image only those second images whose respective blur values are determined to satisfy a blur condition, including in the synthetic image regions of the first image that respectively correspond to only those second images whose respective blur values are determined to not satisfy the blur condition, and generating the synthetic image by stitching together the included second images and the included regions of the first image.

The method may be performed by a computing device including a first camera that captures the first image and a second camera that captures the second images.

The computing device may include a mobile phone.

The generating may include replacing regions of the first image with corresponding second images.

The second images may be captured by automatically changing the direction of a camera that captures the second images.

In a general aspect, a non-transitory computer-readable record medium stores instructions that, when executed by a processor, configure the processor to implement any of the methods.

Other features and aspects will be apparent from the following detailed description, the drawings, and the claims.

Figure 1:
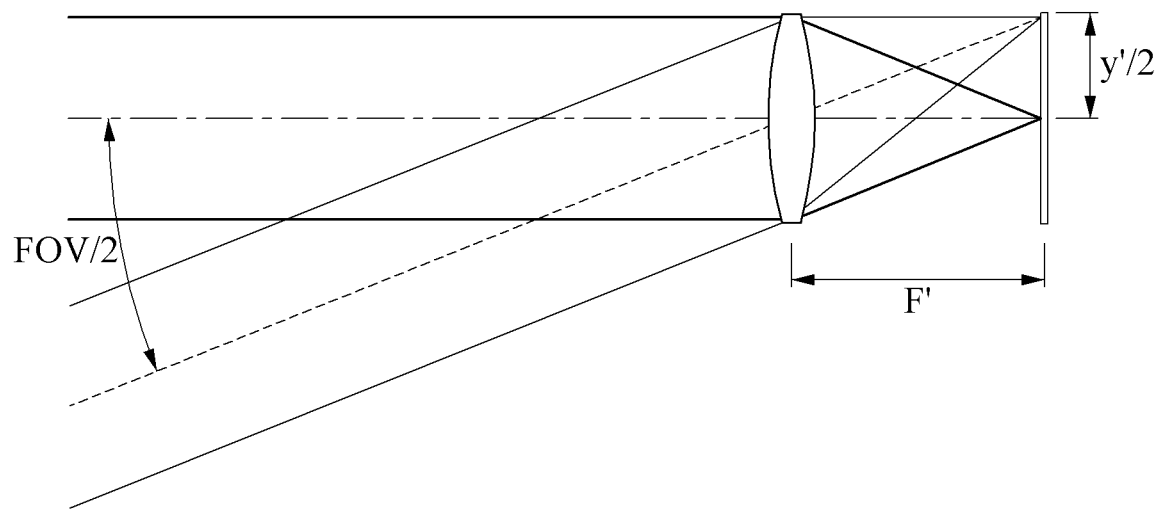
FIG. 1 illustrates a relationship between a focal length, a field of view (FOV), and a size of an image.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

It may be desirable to obtain an image of a long-distance physical scene yet with high resolution. However, a camera may be limited and unable to capture such an image. For example, when a camera has limited or no ability to alter its optical focal length, long distance images taken by the camera may lack quality. Using a camera with a narrow FOV, techniques may be used to capture multiple high-resolution long-distance images of a physical scene and from those images form a synthetic high-resolution long-distance image of the physical scene. The images may be captured by driving a camera's direction of capture (e.g., a direction of the camera's focal axis) to capture the images of the physical scene. The captured images may be stitched together to form a synthetic image of the physical scene. It may be helpful, with such an approach, to provide external parameter information to a camera-driving mechanism that may enable an optical unit (e.g., mirror, lens assembly and sensor, etc.) to be moved according to a set/planned region (or directions therein) and thereby capture images of the physical scene in a way that facilitates stitching the captured images.

Figure 2:
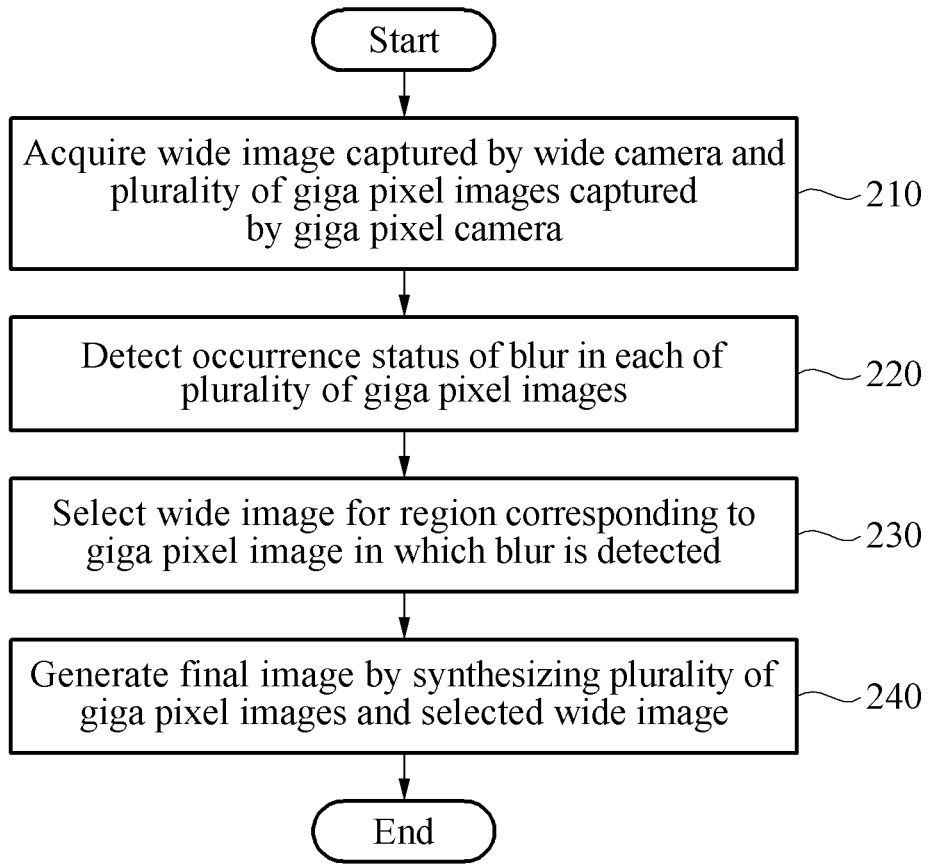
FIG. 2 illustrates an example of generating a high-resolution image, according to one or more embodiments.

FIG. 2 illustrates an example of generating a high-resolution image, according to one or more embodiments. Although the term "high-resolution" may be used herein for explanation, the methods and devices described herein can be used regardless of a desired or available resolution. In operation 210, an electronic device acquires a wide image captured by a wide FOV camera (referred to as a "wide camera" hereafter) and a set of narrow images captured by a narrow FOV camera (referred to as a "narrow camera" hereafter. The narrow camera has a narrower field of view (FOV) than that of the wide camera, at least when the relevant images are captured. The terms "wide" and "narrow" are used herein only to describe the cameras (and correspondingly captured images) relative to each other, and the characteristics of each camera are otherwise unlimited. The relative differences in the FOVs of the two cameras may be a result of adjustable configurations of the cameras; at other times, the wide camera may actually have a narrower field of view than the narrow camera. In some embodiments, each camera has a fixed focal length.

In one example of the electronic device, the wide camera may operate, in ways that will be explained below, as a reference camera, while the narrow camera may operate as a dynamic camera. In response to an input, for example activation of a shoot button by a user, the narrow camera and the wide camera may capture images simultaneously or in close temporal proximity. At the time of the input, the narrow camera, having a FOV relatively narrower than the FOV of the wide camera, may capture the set of narrow images. The narrow images may be synthesized into a synthetic image that may have a size that corresponds to a wide FOV (or corresponding portions of the wide image), and in some examples the synthetic image may approximate the FOV of the wide camera.

As noted above, the narrow camera may capture a set of narrow images based on an external parameter. For example, the narrow camera may capture images over a region (e.g., set of directions) corresponding to at least a portion of the FOV of the wide camera while moving based on the external parameter. This may allow the narrow images to collectively cover a same physical scene that is in the FOV of the wide camera. Images may be captured by the narrow camera while sequentially moving a lens (mirror, and/or assembly, etc.) of the narrow camera to directions within (or corresponding to) a region set based on the external parameter. As a non-limiting example, in a periscope example narrow camera, a mirror reflecting incident light toward an image sensor may be adjusted. Also, a calibration parameter may be determined based on a zoom magnification or a resolution set by a user, for example. The number of times a narrow image is captured by the narrow camera (for a given synthetic image) may be determined based on the calibration parameter.

The narrow camera may be driven N times to capture N narrow images that, collectively, approximately correspond to the FOV of the wide camera. In some examples, the region (or effective FOV) covered by the narrow images may be smaller than the FOV of the wide camera. To increase a driving speed of a camera and to facilitate synthesis between captured images, a camera shooting condition for a physical scene may be maintained to be constant while capturing the narrow images. For example, while the narrow camera is scanning and shooting the physical scene, the same shutter speed, aperture value, and/or international standard organization (ISO) value may be maintained.

In operation 220, the electronic device detects blur statuses or values of the respective narrow images. For example, the electronic device may detect a blur value of a narrow image. The blur values may be evaluated against a blur condition. For example, the blur values of the narrow images may be compared with corresponding blur values of regions of the wide image. The blur values may be compared to a threshold blur value (blur condition) to select narrow images. Various blur detection methods may be applied, for example, blur may be calculated using a sharpness algorithm. A sharpness of a narrow image may be compared with a sharpness of a corresponding region of the wide image. Any known technique for measuring blur of an image may be used.

When capturing narrow images of a subject with little movement, a blur value may indicate relatively low blur. In the case of shooting a subject with significant movement, a blur value of a narrow image may indicate significant blurring. Blurring may occur, for example, due to a time difference between acquired narrow images; during the time between capturing narrow images, there may be movement of the device and/or a subject being captured.

In operation 230, the electronic device selects, for inclusion in the synthetic image, a region of the wide image corresponding to a narrow image in which blur is detected or is determined to meet a blur condition. To elaborate, narrow images captured by the narrow camera may be synthesized into a synthetic image by, for example, stitching together the narrow images. However, regarding operation 230, a narrow image being evaluated to be potentially synthesized into the synthetic image may be selected (or omitted) for inclusion in (or exclusion from) the synthetic image based on presence or absence of the blur phenomenon detected, for example, through comparison between the narrow image and a corresponding region of the wide image, for example. For example, if blur of the narrow image is less than (or within a range of) blur of the region in the wide image, then the narrow image may be selected.

A narrow image whose blur value is determined to be below a threshold, for example, may be selected to be used for synthesis. A narrow image whose blur value is determined to be above the threshold may be omitted from the synthetic image and may be replaced with a corresponding region of the wide image, which may be used for synthesis. Narrow images may be synthesized using the wide image as a reference and a final synthetic image in which the narrow images (and one or more regions of the wide image) are synthesized may be provided.

In operation 240, the electronic device generates the final synthetic image by synthesizing (e.g., stitching together) the narrow images selected for inclusion and any selected regions of the wide image.

To summarize, in an example, image synthesis may be performed by using a wide image as a reference. Each of the selected narrow images may be arranged (in the synthetic image) at a position corresponding its position relative to the wide image. Each narrow image may be arranged based on a position (or direction) at which a first narrow image was captured and may be synthesized at such position (or direction). Arrangement and synthesis of narrow images (or their replacement regions), in some examples, may follow the order in which the narrow images are captured, thus allowing the narrow images (and any of their replacement regions) to be stitched together in chain-like fashion. In some embodiments, narrow images replace, according to blur thereof, regions in the wide image. In other embodiments, according to blur of the narrow images, regions of the wide image are extracted from the wide image and stitched to narrow images.

Once a narrow image is captured, whether blur is sufficiently present in the narrow image may be verified before synthesizing the captured narrow image. As described above, whether blur is sufficiently present in a narrow image may be verified, for example, against a threshold blur value (or in comparison to blur of a region of the wide image). When the blur is sufficiently high (absolutely or relatively), the blurred narrow image may be replaced with a corresponding region of the wide image that is included in the synthetic image. When the blur is not sufficient or is absent, the corresponding narrow image may be used for synthesis.

When synthesizing a narrow image, a region in which a relatively low-resolution wide image is selected may be expressed as a high-resolution image using digital super resolution to express a resolution closer to that of a surrounding high-resolution image. Examples of synthesizing a narrow image are further described below.

Figure 3:
FIG. 3 illustrates an example in which a blur occurs for a narrow FOV camera, according to one or more embodiments.

FIG. 3 illustrates an example in which blur occurs for a narrow camera, according to one or more embodiments. For an example camera system, a narrow camera and a wide camera are simultaneously present in the camera system. The wide camera may acquire a relatively low-resolution wide FOV image of a physical region and the narrow camera may acquire N relatively high-resolution narrow images of the physical region through scanning with the narrow camera.

Referring to the example shown in FIG. 3, 25 narrow images corresponding to a FOV of a wide image that corresponds to the scene of FIG. 3 may be acquired and synthesized to form a high-resolution image for the same or similar FOV as the wide image.

In an example, N narrow images may be acquired. The number of images captured, N, and a resolution thereof, may be determined based on a calibration parameter that is set when image capturing is triggered or starts.

Referring to FIG. 3, blur may be caused in at least a portion of a narrow image 301 due to a movement of a subject to be shot. In an example, the narrow camera is not robust against movement of a subject and blur may occur accordingly.

A narrow image in which blur occurs may be verified through comparison to a corresponding region of the wide image. Or a degree of blur in the narrow image may be evaluated without comparison to a region of the wide image.

For blur evaluation, the wide image may be segmented into N regions (possibly overlapping) to correspond to the N narrow images, respectively. Blur values of the N regions may be respectively computed. Blur of the narrow images may be evaluated by comparing each region's blur value with a blur value of a narrow image corresponding to the region. The narrow image 301 in which the blur phenomenon is detected may be replaced with a portion of the wide image that covers the same region corresponding to the narrow image 301.

Figure 4A:
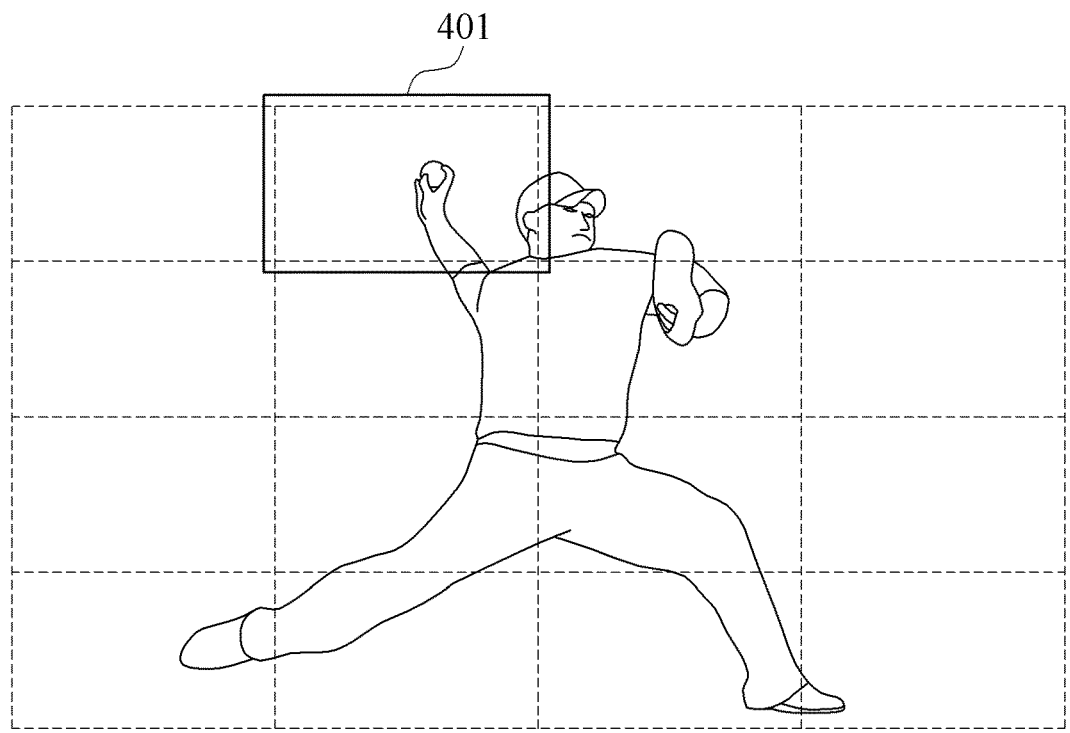
FIG. 4A illustrates an example of a wide image captured by a wide FOV camera, according to one or more embodiments.
Figure 4B:
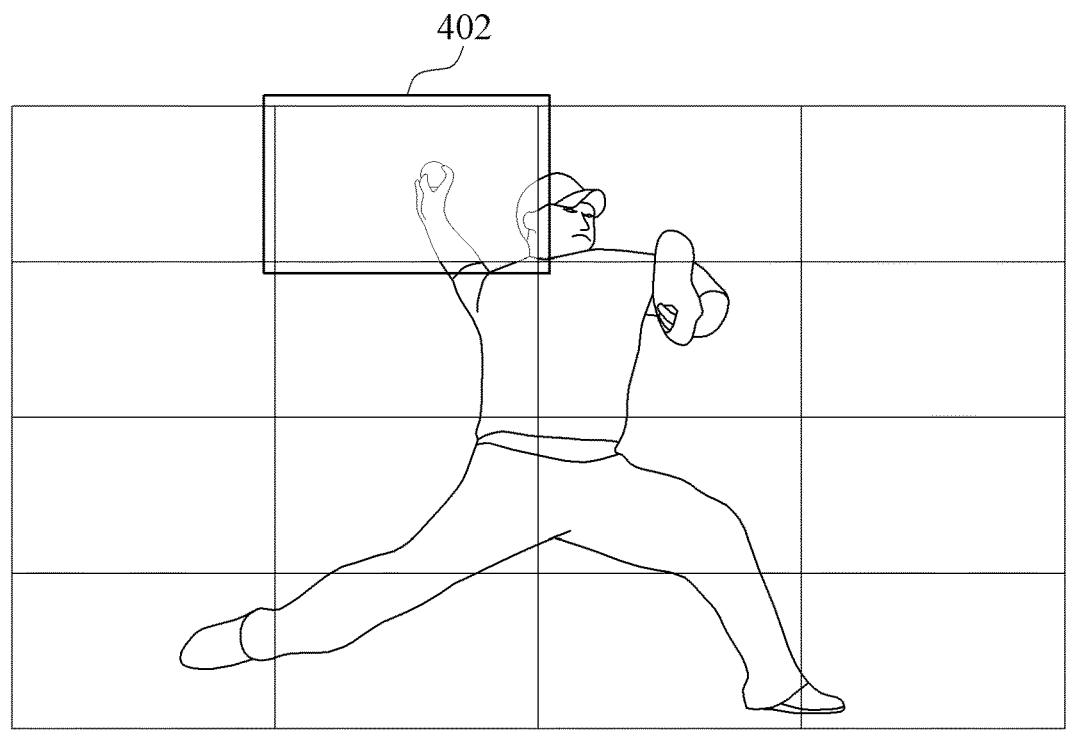
FIG. 4B illustrates an example of a narrow image captured by a narrow FOV camera, according to one or more embodiments.

FIG. 4A illustrates an example of a wide image captured by a wide camera, according to one or more embodiments. FIG. 4B illustrates an example of a narrow image captured by a narrow camera, according to one or more embodiments.

In an example, a blur status may be determined by comparing a region 401 of a wide image (FIG. 4A) and a narrow image 402 corresponding to the region. A blur intensity (blur value) may be compared between the narrow image 402 and the region 401 of the wide image corresponding to the narrow image 402. The narrow image 402 may be replaced (for use in the synthetic image) with the region 401 of the wide image based on a comparison result, for example, if it is determined that the narrow image 402 is blurrier than the region 401 of the wide image.

In an example, in a high-resolution image in which most of the narrow images of FIG. 4B are synthesized into the final image, the narrow image 402 in which a blur status is verified may be replaced with the corresponding region 401 of the wide image, which may be synthesized along with the narrow images.

An order of synthesizing (e.g., stitching together) narrow images and/or regions of the wide image may be performed in the order of capturing the narrow images, e.g., according to a scan direction of the narrow camera. In general, scanning may be performed in a zigzagged direction from an upper left end of the region corresponding to the final synthetic image. In the example of FIGS. 4A and 4B, capturing of the narrow image 402 may be performed after capturing a narrow image to the left thereof, and when the region 401 of the wide image is used in place of the corresponding narrow image 402, the region 401 may be synthesized with the other narrow images based on a result of evaluating the blur. And, the synthesis of the region 401 may be performed in a turn (order) when the narrow image 402 that it replaces was captured.

In an example, to synthesize the region 401 of the wide image, any of various digital super-resolution image enhancing techniques may be used to transform a low resolution of the region 401 of the wide image to a high resolution. Moreover, a criterion for determining whether to perform digital-super resolution enhancing for the region 401 of the wide image may be set and whether to perform the digital super resolution may be determined according to the criterion. For example, a complexity of an image to be synthesized may be determined and used as the criterion. Alternatively, a difference in a resolution between the region 401 of the wide image and the narrow image 402 may be used as the criterion.

In one embodiment, the synthetic image may be generated by starting with the wide image. Each narrow image for which a blur phenomenon is absent may be overwritten over a corresponding region in the wide image, and each narrow image in which the blur phenomenon is verified may not be used in the wide image. For a region not overwritten by a narrow image, a corresponding region of the wide image in which the blur phenomenon is absent may be selected and may, in some examples, have its resolution increased.

Figure 5A:
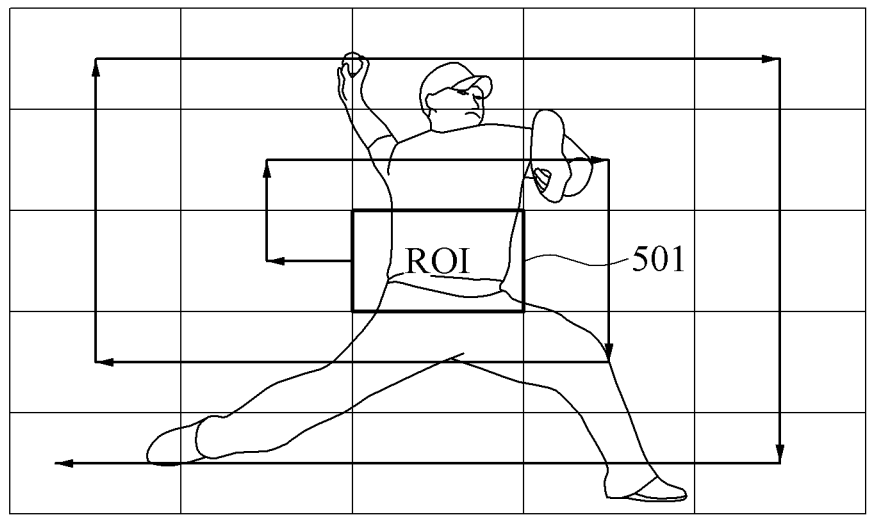
FIG. 5A illustrates an example of replacing an image portion of a region captured by a wide FOV camera, according to one or more embodiments.
Figure 5B:
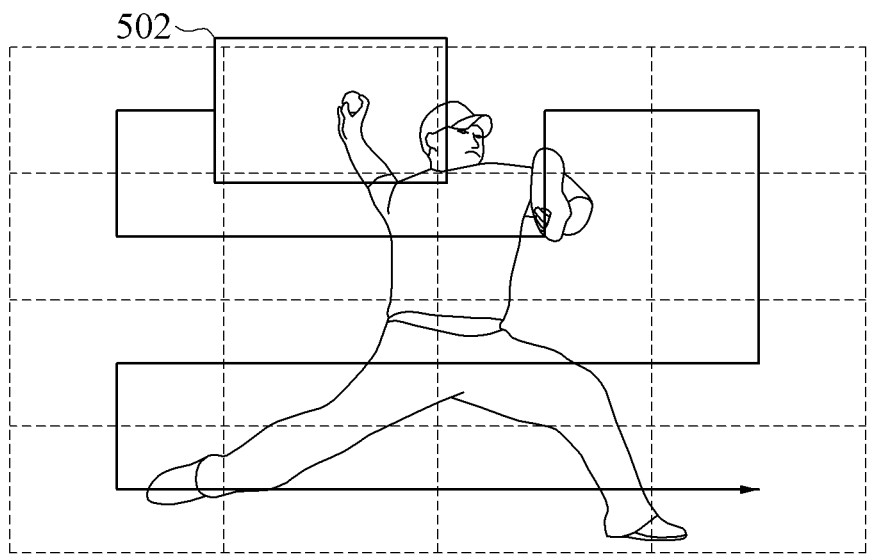
FIG. 5B illustrates an example of a different ROI, according to one or more embodiments.
Figure 5C:
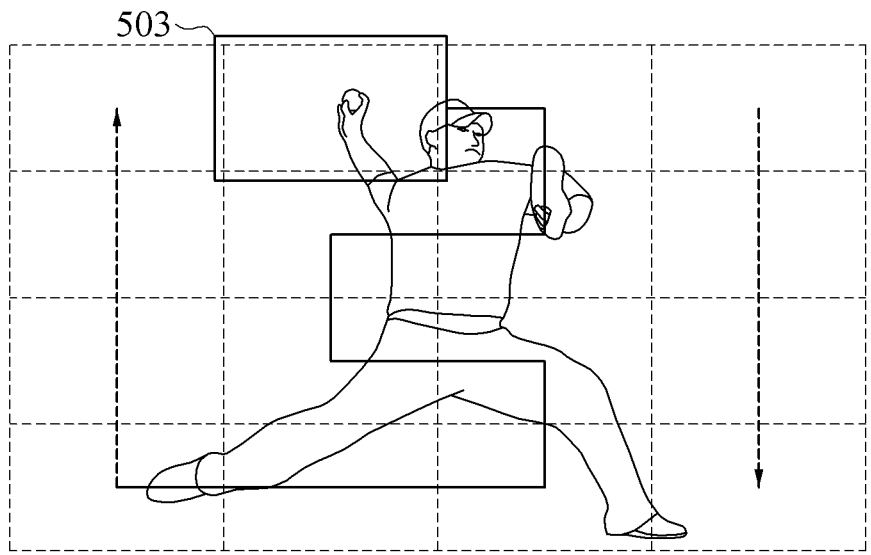
FIG. 5C illustrates an example of shooting a detected dynamic object based on an ROI, according to one or more embodiments.

FIGS. 5A-5C illustrate an example of setting a scanning region of a narrow camera, according to one or more embodiments.

FIG. 5A illustrates an example of replacing an image of a region captured by a wide camera, according to one or more embodiments. To reduce the chance of blur when a narrow image is captured, a region of interest (ROI) 501 of the wide image may be acquired and an external parameter may be set to perform shooting based on the ROI 501, e.g., shooting a region adjacent to the ROI 501 using the narrow camera.

In an example, an ROI may be set by acquiring information about a dynamic object from a wide image of a wide camera. Alternatively, a user-specific position may be set as the ROI. That is, an input from a user input device (e.g., a location on a touch-sensitive screen) may be used as the ROI.

In an example, referring to FIG. 5A, the narrow camera may shoot the ROI 501 first and may shoot each successive region through sequential scanning in a clockwise direction starting with a left image of the ROI 501.

In an example, an ROI may be the center of an image and a moving subject may be designated in the ROI. The narrow camera may first shoot the ROI based on the set external parameter and may shoot a region nearest to the ROI through scanning in a clockwise direction or a counterclockwise direction.

When capturing N images with the narrow camera, a short time difference may occur between a first image and an Nth image. Also, due to a movement of the camera or a movement of the subject during a time between capturing narrow images, blur may occur accordingly. A method of scanning with the narrow camera may be set to decrease an occurrence probability (or degree) of blur.

To this end, the external parameter of the narrow camera may be set for scanning while moving in a clockwise direction or may be set for scanning while moving in a counterclockwise direction.

FIG. 5B illustrates an example of a different ROI, according to one or more embodiments. In the example shown in FIG. 5B, an ROI 502 is different from the ROI of FIG. 5A. Although a clockwise or the counterclockwise scanning direction is described above, that is only an example. If all narrow images are not covered in the clockwise/counterclockwise direction, an algorithm for determining shooting order of the narrow camera may be applied. For example, an Eulerian trail algorithm may be applied to select a region not covered in the clockwise direction or the counterclockwise direction.

FIG. 5C illustrates an example of shooting a detected dynamic object based on an ROI 503, according to one or more embodiments. The solid line in FIG. 5C represents a scan direction in which a narrow camera shoots regions in which a dynamic object is detected and a dotted line represents a scan direction of a narrow image in which a dynamic object is not included.

An entire region of the dynamic object may be detected based on the wide image. The narrow camera may perform sequential shooting by applying an Eulerian trail (path) algorithm to the corresponding dynamic object region and may perform shooting using a predetermined method for shooting regions where a dynamic object is not included, for example, in the clockwise direction or the counterclockwise direction, as non-limiting examples.

Each of the captured narrow images may be compared with a corresponding wide image region that serves as a reference, and when a blur phenomenon is not verified, may be synthesized with the wide image of the corresponding region. When the blur phenomenon is verified, the wide image of the corresponding region may be used as is. In other words, in some examples, the wide image may serve as an initial image and regions thereof may be synthetically replaced by corresponding non-blurry narrow images. Nonreplaced regions of the wide image may have their resolution artificially increased, as discussed above.

Figure 6:
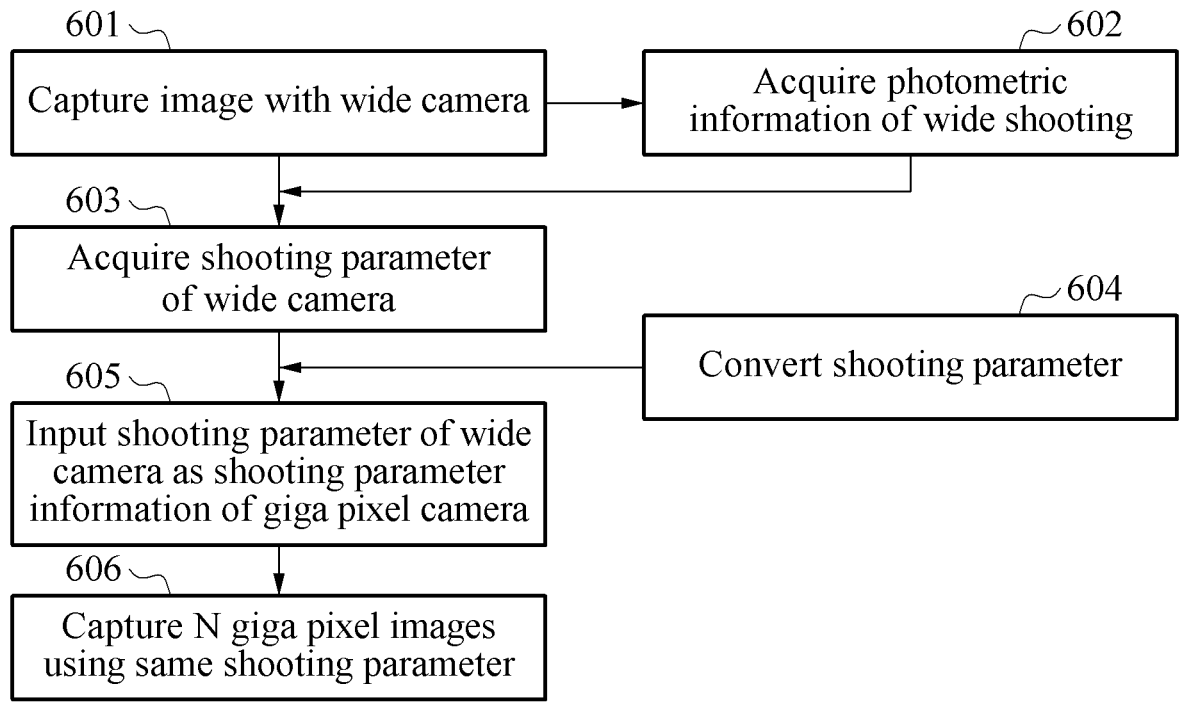
FIG. 6 illustrates an example of determining a shooting parameter of a narrow FOV camera, according to one or more embodiments.

FIG. 6 illustrates an example of determining a shooting parameter of a narrow camera, according to one or more embodiments. In an example, a same shutter speed, aperture value (f/#), ISO value, etc., of the wide camera may be applied to the narrow camera. N narrow images may be captured. In operation 601, a device may capture an image with the wide camera. In operation 602, the device may acquire photometric information in relation to shooting the wide camera. For example, information about intensity of light being sensed may be acquired. In operation 603, the device may acquire a shooting parameter of the wide camera. In an example, the shooting parameter, such as a shutter speed, an aperture value (f/#), and ISO value, etc., may be acquired based on a light intensity measurement value. The shooting parameter may be determined by referring to a lookup table based on the light intensity measurement value, where the lookup table maps light intensities (or other light features) to one or more shooting parameters.

To reduce a shooting time of the narrow camera in the process of acquiring a high-resolution image, the photometric intensity of the wide camera may be applied for shooting of the narrow camera.

Also, when acquiring narrow images with the narrow camera, the same shooting condition of the narrow camera may be applied when shooting each narrow image, which may help to maintain a constant shooting speed for every time a position or direction of the narrow camera is moved.

In operation 604, the electronic device may convert the shooting parameter to fit the narrow camera. In operation 605, the electronic device may input the converted shooting parameter to the narrow camera as the shooting parameter used for capturing the narrow images. In operation 606, the electronic device may capture N narrow images using the same shooting parameter. Moreover, the narrow camera may perform the N times of shooting by using the wide image as a reference, and the shooting may be in a predetermined order or may be based on an ROI detected in the wide image, for example.

Figure 7A:
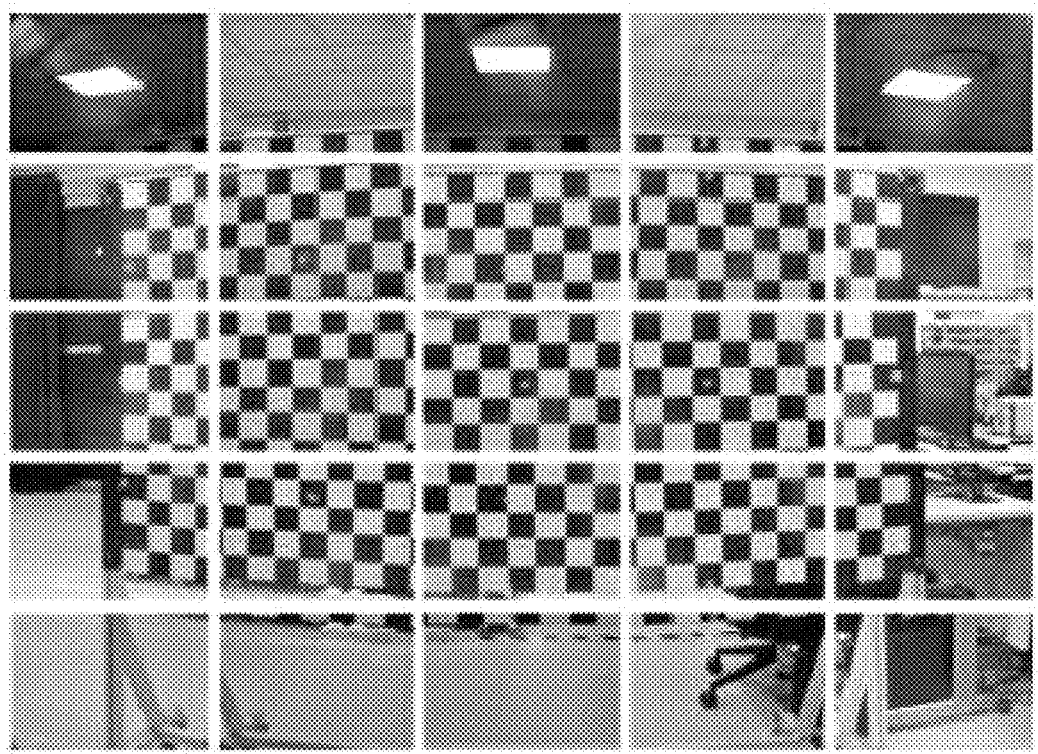
FIG. 7A illustrates an example of a narrow image captured without adjusting a shooting parameter of a narrow FOV camera, according to one or more embodiments.
Figure 7B:
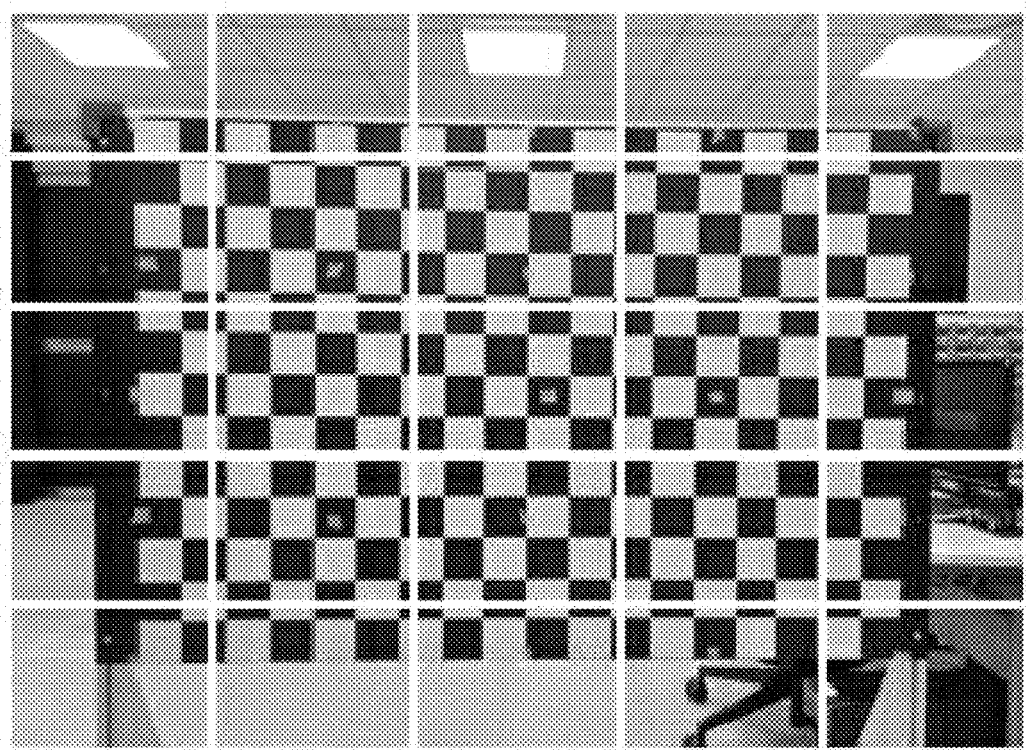
FIG. 7B illustrates an example of an image captured after a shooting parameter of a narrow FOV camera is transformed to correspond to a shooting parameter of a wide FOV camera, according to one or more embodiments.

FIG. 7A illustrates an example of an image 700A captured without adjusting a shooting parameter of a narrow camera, according to one or more embodiments. FIG. 7B illustrates an example of an image 700B captured after a shooting parameter of a narrow camera is transformed to correspond to a shooting parameter of a wide camera, according to one or more embodiments.

Referring to FIG. 7A, when each narrow image is captured, an angle of a camera is different and the corresponding narrow image is captured at a different shooting time. Therefore, a light intensity condition may be different for each partial region of a subject to be shot and accordingly, a camera shooting condition may change. If a shooting condition is not set (kept constant during shooting), a shooting speed of the narrow camera may be differently determined for each shot. Dynamic adjustment of a shooting condition, for example, may be a major factor that can cause a delay for shooting each narrow image. Moreover, if a shooting condition of each captured narrow image is different, it may be difficult to perform matching or stitching.

In an example, when a shooting parameter of the narrow camera is applied to the same subject in the same manner as that of the wide camera, it may require less computation to match captured images between top, bottom, left, and right as shown in FIG. 7B.

In some examples, the light intensity may be calculated to maintain a constant shooting speed of the narrow camera for each region the camera is moved/pointed to by a motor, electromagnetic field, etc. By providing the same light intensity condition to all the partial regions during shooting, the same shooting condition, such as a shutter speed, f/#, ISO value, etc., may be maintained.

Figures 8A, 8B:
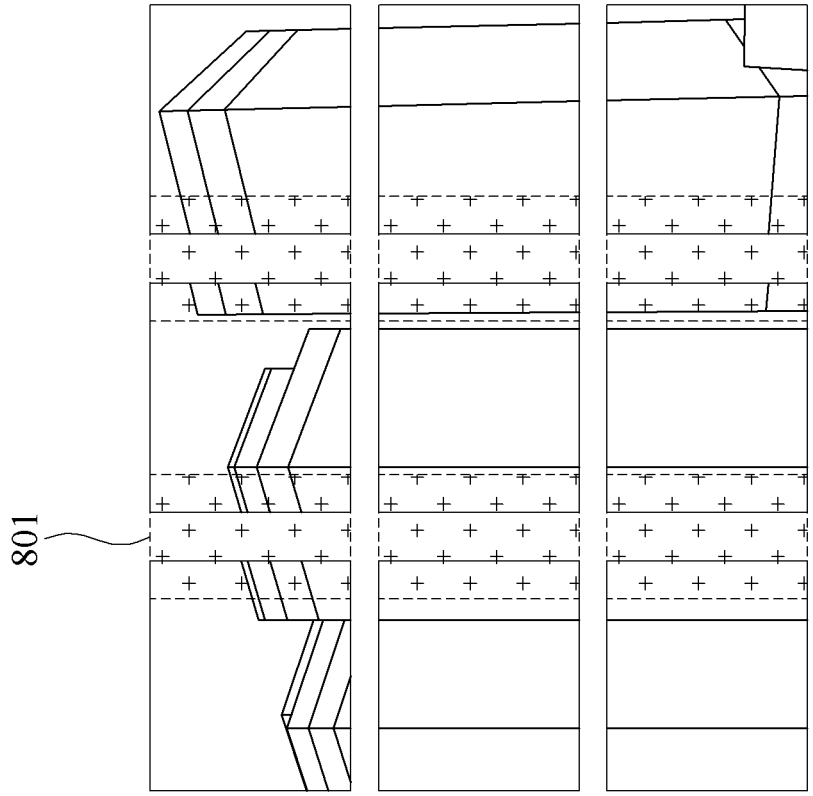
FIG. 8A illustrates an example of vertical overlapping of narrow images, according to one or more embodiments.
FIG. 8B illustrates an example of horizontal overlapping of narrow images, according to one or more embodiments.

FIGS. 8A and 8B illustrate an example of a method of setting an overlapping region of a narrow image.

When synthesizing narrow images captured using calibration information, it may be beneficial to acquire narrow images such that an overlapping portion between adjacent images is 0% or as close to 0% as practical.

When capturing a narrow image, an error may occur in calibration information that includes an external parameter and an internal parameter. This may be due to an error in position movement and rotation of a motor that drives the narrow camera and/or an inaccuracy in optical information of a camera. Due to such errors, adjacent images may overlap.

In an example, overlapping between adjacent narrow images may be set to be within a minimum of 0% to a maximum of 30%. As an overlapping region between adjacent images increases, an amount of time used to generate a final image by combining images may increase. If the overlap of one or more narrow images would be more than the maximum, then a region of the wide image may be used instead.

FIGS. 8A and 8B illustrate an example of overlapping tolerance of such adjacent images. Referring to FIG. 8A, image overlapping within 30% may be allowed on the left and the right of a corresponding narrow image. Referring to FIG. 8B, image overlapping within 30% may be allowed on the top and bottom of a corresponding narrow image. Although 3×3 narrow images are illustrated, the technique may apply to any N×N (or N×M) narrow images.

Figure 9:
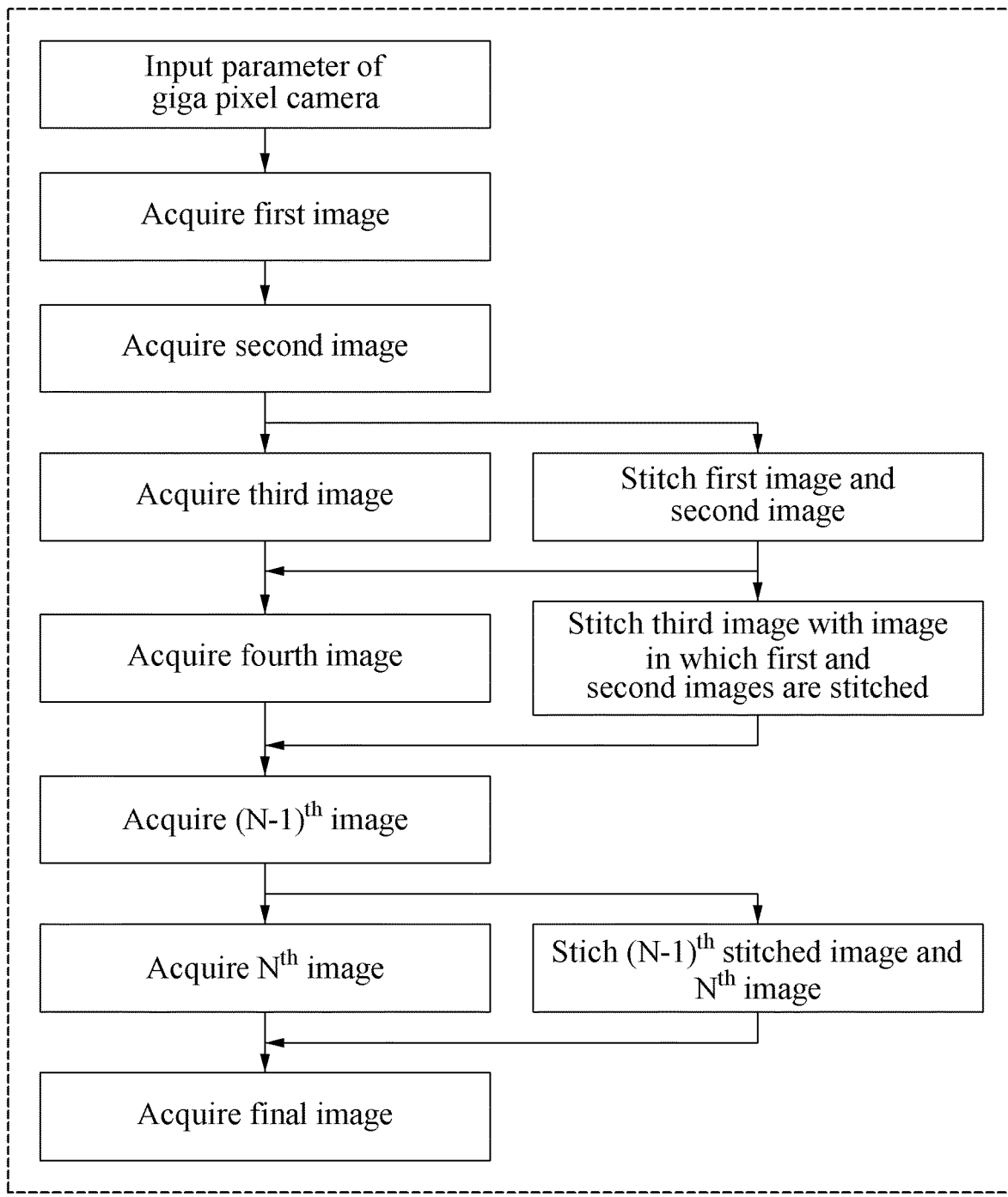
FIG. 9 illustrates an example of generating a synthetic image, according to one or more embodiments.

FIG. 9 illustrates an example generating 900 a synthetic image, according to one or more embodiments.

In an example, calibration information that includes an external parameter and an internal parameter may be provided.

A narrow camera may capture a first image at an initial shooting position based on input information. The narrow camera may capture a second image at a second position and may synthesize, for example stitch, the first image and the second image while capturing a third image at a third position.

Also, while capturing a fourth image, the third image may be synthesized, for example stitched, with an image in which the first image and the second image are synthesized, for example stitched. In this manner, synthesis may be performed up to an Nth image.

A shooting and synthesizing process is repeated up to an Nth image. When an (N−1)th image and an Nth narrow image have been captured, all that may remain to produce the final synthetic image may be to finish any remaining synthesis, for example stitching.

Figure 10:
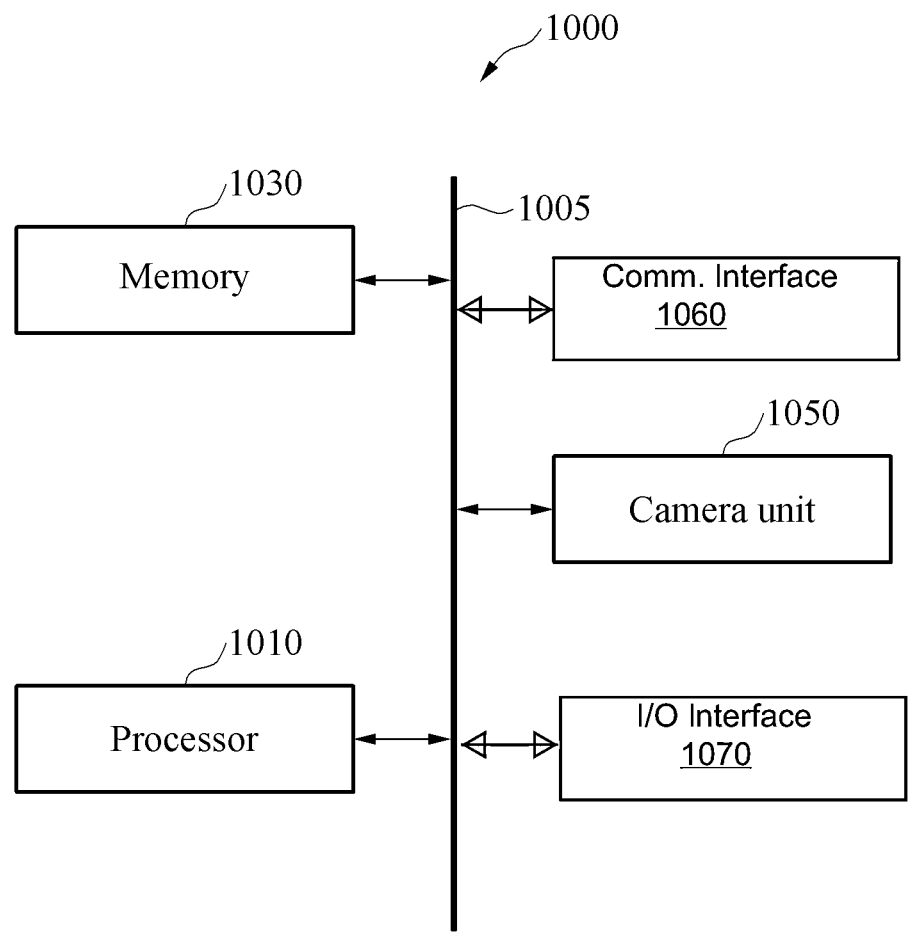
FIG. 10 illustrates an example of a device with synthetic image generation, according to one or more embodiments.

FIG. 10 illustrates an example of a device with synthetic image generation, according to one or more embodiments.

Referring to FIG. 10, a device 1000 (e.g., an electronic device) may include a processor 1010, a memory 1030, a camera 1050, and a communication interface device 1060 for wireless communication. The processor 1010, the memory 1030, and the camera 1050 may communicate with each other through a communication bus 1005. The camera 1050 is representative of plural cameras, such as any of the wide FOV cameras and narrow FOV cameras described herein, as well as any other cameras.

The processor 1010 may execute instructions (e.g., code fora program) for generating a synthetic image. A wide (first) image may be captured by the wide (first) camera and a plurality of narrow (second) images may be captured by the narrow (second) camera, which may have a narrower FOV than that of the wide camera (at least when the first and second images are captured). Blur in each of the narrow images may be evaluated by the processor 1010 to select a region of the wide (first) image for inclusion in the synthetic image when the corresponding narrow image is sufficiently blurred. The synthetic image may be generated by the processor 1010 synthesizing the plurality of narrow (second) images (excluding any sufficiently blurred narrow images) and the selected region of the wide (first) image.

The camera 1050 is also representative of a motor for adjusting a shooting zone/region and a camera optical lens for capturing a plurality of images. For example, the motor may adjust the shooting zone/region/direction of the narrow camera of the camera 1050.

The processor 1010 may apply, to the narrow camera, an average photometric light intensity value associated with the wide camera and use that value for the narrow camera to increase the capturing and driving speed of the narrow camera. For example, the capturing parameter, such as a shutter speed, f/#, ISO value, etc., of the wide camera may be applied to the narrow camera.

When synthesizing captured images, the processor 1010 may sequentially/consecutively synthesize the acquired image data based on calibration information.

The memory 1030 may control a volatile memory or a non-volatile memory, and the processor 1010 may execute instructions from the memory 1030 and may thereby control the device 1000. Code executed by the processor 1010 may be stored in the memory 1030. The device 1000 may exchange data through a connection to an external system, for example, a personal computer or a network, through an input/output (I/O) interface device 1070. The device 1000 may be, or be mounted to or incorporated, in various computing devices and/or systems, such as a smartphone, a tablet computer, a laptop computer, a desktop computer, a television (TV), a wearable device, a security system, and a smart home system.

Some examples of the device 1000, such as a smartphone, may provide a method of generating a high-quality image using a narrow image of a narrow camera. In an example of a product application, a narrow camera of a smartphone may include the motor and an optical lens for scanning and may include a computing device configured to acquire a final image.

The computing apparatuses, the vehicles, the electronic devices, the processors, the memories, the image sensors, the vehicle/operation function hardware, the ADAS/AD systems, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:
   acquiring a first image captured by a first camera and second images captured by a second camera having a narrower field of view (FOV) when the second images are captured thereby than that of the first camera when the first image is captured thereby;
   detecting respective blur statuses of each of the second images;
   selecting a region of the first image on the basis of the region corresponding to a second image, of the second images, selected based on a determination that the blur status of the second image satisfies a blur condition; and
   generating a synthetic image by synthesizing together the selected region of the first image and the second images not including the selected second image.

2. The method of claim 1, wherein the second images are captured based on scanning movements of the second camera caused by a motor, wherein the scanning movements are determined based on a determined region of interest (ROI).

3. The method of claim 2, wherein the ROI is determined based on an object detected within the FOV of the first image or is determined based on a position based on an input generated by a user input device.

4. The method of claim 1, wherein the acquiring of the first image comprises inputting an external parameter and an internal parameter to the second camera.

5. The method of claim 4, wherein the external parameter specifies movement of the second camera, and the internal parameter specifies an optical performance of the second camera.

6. The method of claim 1, wherein the acquiring of the second images comprises determining a shooting condition of the first camera in correspondence with capturing the first image and applying the shooting condition to the second camera for capturing the second images.

7. The method of claim 6, wherein the shooting condition of the first camera comprises one or more of a shutter speed, an aperture value, or an international standard organization (ISO) value of the first camera.

8. The method of claim 1, wherein the blur statuses comprise respective measures of blur in the second images, and wherein the blur condition comprises comparing a measure of blur in a region of the first image with a measure of blur in a second image.

9. The method of claim 1, wherein the generating of the synthetic image comprises stitching the selected region of the first image with a second image that corresponds to a region of the first image that is adjacent to the selected region of the first image.

10. The method of claim 1, wherein the generating of the synthetic image comprises performing a digital super resolution enhancement on at least a portion of the selected region of the first image.

11. The method of claim 1, wherein the second images respectively correspond to regions of the first image, and wherein each of plural regions of the first image is adjacent to another region of the plural regions of the first image.

12. A non-transitory computer-readable record medium storing instructions that, when executed by a processor, configure the processor to implement the method of claim 1.

13. A device comprising:
   at least one processor configured to:
      access a first image of a physical area captured by a first camera;
      access second images of the physical area captured by a second camera;
      compute respective blur values of the second images;

select a region of the first image based on determining that a blur condition is satisfied by a blur value of a second image, of the second images, that corresponds to the region; and generate the synthetic image by synthesizing together the selected region and the second images not including the second image that corresponds to the selected region.

14. The device of claim 13, wherein the device is an electronic device that further comprises the first camera and the second camera.

15. The device of claim 14, wherein the second camera has a movable direction of capture, wherein the second images are captured by moving the direction of capture in a clockwise direction or in a counterclockwise direction.

16. The device of claim 14, wherein the moving of the direction of capture is based on a region of interest (ROI) determined based an object detected within the first image or based on a position indicated by an input received from a user input device.

17. The device of claim 14, wherein the at least one processor is configured to provide an external parameter and/or an internal parameter to the second camera.

18. The device of claim 17, wherein the external parameter indicates performance of a motor for moving the second camera, and the internal parameter comprises a photographic parameter of the second camera.

19. The device of claim 13, wherein the at least one processor is further configured to:

apply to the second camera an image-capturing parameter in effect for the first camera when the first camera captures the first image and control the second camera with the applied image-capturing parameter to capture the second images.

20. The device of claim 19, wherein the image-capture parameter comprises at least one of a shutter speed, an aperture value, or an international standard organization (ISO) value of the first camera.

21. The device of claim 13, wherein the device is a smartphone.

22. The device of claim 13, wherein the blur condition comprises a blur value of the region of the first image and the determining whether the blur condition is satisfied comprises comparing the blur value of the region of the first image with the blur value of the second image corresponding to the region of the first image.

23. The device of claim 13, wherein the synthesizing comprising stitching the region of the first image with at least one of the second images.

24. The device of claim 13, wherein the at least one processor is further configured to perform a digital super resolution on an interface of a second image and the selected region of the first image.

25. The device of claim 13, wherein the synthetic image comprises an image of the physical area.

26. The device of claim 13, further comprising:

the first camera and the second camera, the first camera having a wider field of view (FOV) than the second camera.

27. A method comprising:

capturing a first image of a physical scene, wherein the physical scene comprises physical regions, and the first image comprises regions that depict the physical regions, respectively;

capturing second images of the physical scene, wherein the second images respectively depict the physical regions;

computing respective blur values for the second images;

generating a synthetic image based on the first image, the second images, and the blur values, the generating comprising:

including in the synthetic image only those second images whose respective blur values are determined to satisfy a blur condition;

including in the synthetic image regions of the first image that respectively correspond to only those second images whose respective blur values are determined to not satisfy the blur condition; and generating the synthetic image by stitching together the included second images and the included regions of the first image.

28. The method of claim 27, wherein the method is performed by a computing device comprising a first camera that captures the first image and a second camera that captures the second images.

29. The method of claim 28, wherein the computing device comprises a mobile phone.

30. The method of claim 27, wherein the generating comprises replacing regions of the first image with corresponding second images.

31. The method of claim 27, wherein the second images are captured by automatically changing the direction of a camera that captures the second images.

* * * * *